Nov. 19, 1957 W. SCHMIDT 2,813,787
METHOD OF REDUCING METAL COMPOUNDS WITH AMALGAM
Filed July 3, 1952
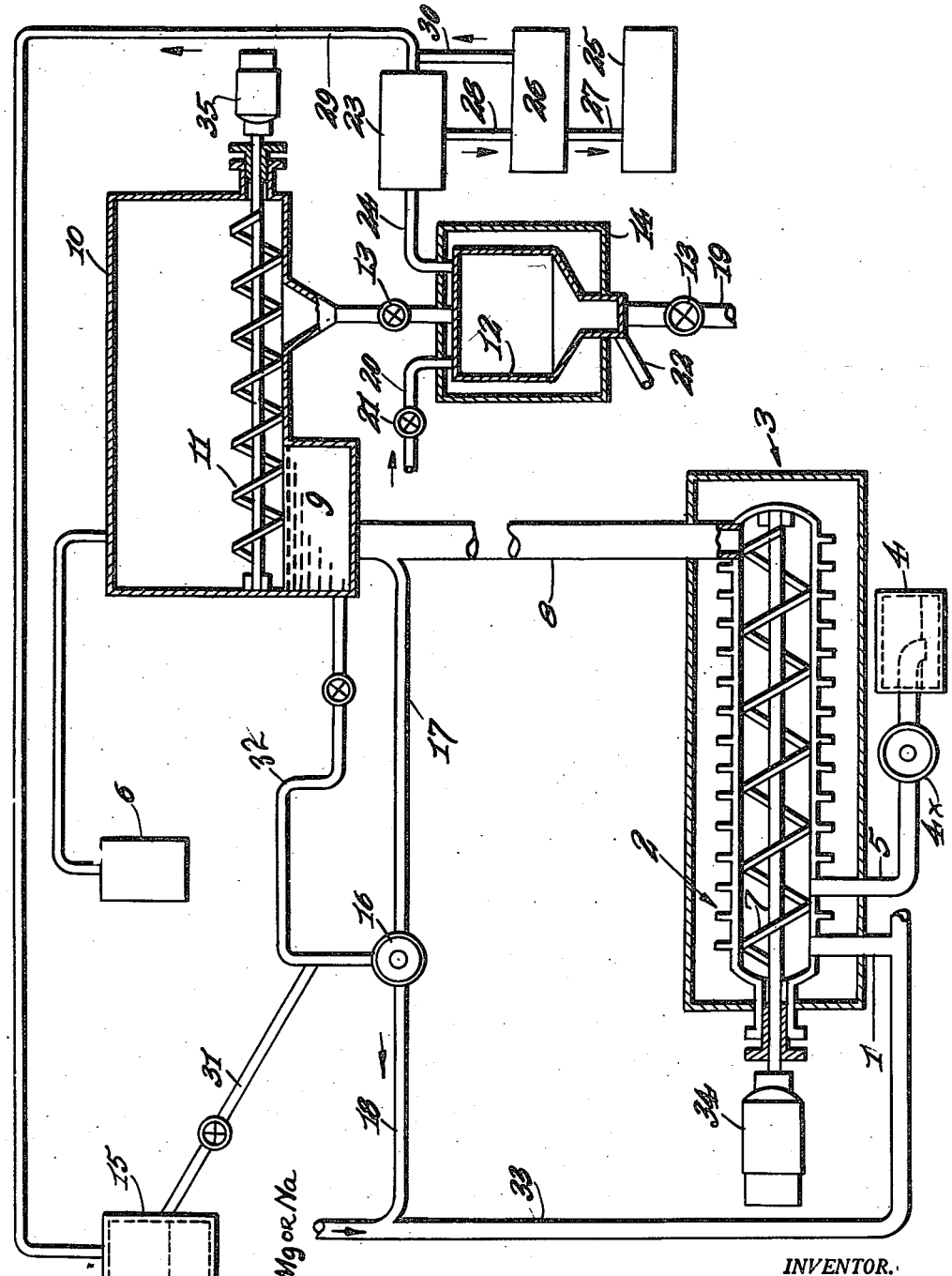
INVENTOR.
Walther Schmidt
BY
H. Lee Helms
ATTORNEY.

United States Patent Office 2,813,787
Patented Nov. 19, 1957

2,813,787
METHOD OF REDUCING METAL COMPOUNDS WITH AMALGAM

Walther Schmidt, Richmond, Va., assignor to Reynolds Metals Company, Richmond, Va., a corporation of Delaware Application July 3, 1952, Serial No. 297,199

3 Claims. (Cl. 75—84.5)

Various metals such as beryllium, chromium, titanium, vanadium or zirconium or alloys thereof, are difficult to reduce because of their high melting point or because of their chemical properties. Many of them are very susceptible to the chemical action of air, gases, or various refractory materials when in contact with them at higher temperatures. The reduction of these metals from their compounds, preferably from their halogen-compounds, by means of a reducing metal, such as Mg, or an alkali-metal, such as Na or K has already been accomplished. Attempts have been made to reduce some of these metals using Na or K in the form of their amalgams. But since the reaction temperature is most efficient above the boiling point of Hg, the heat evolved by the exothermal reaction causes many difficulties. Therefore, this work was done in relatively small batches in closed bombs or autoclaves and obviously could not be done by a continuous operation.

It is an object of this invention to reduce such difficultly reduceable metals by a continuous process.

It is also an object to prepare such metals through the use of mercury.

These and further objects of this invention will become apparent on reading the disclosure in conjunction with the accompanying drawing in which a schematic presentation of the process is set forth.

According to this invention the reducing material, being selected from the group consisting of alkali metals and alkaline earth metals, e. g. Mg or Na, is applied mixed, dissolved, or suspended in a liquid metal, preferably mercury. Suitable reducing mixtures may be prepared according to the following examples:

(1) Aqueous solutions, e. g. of NaCl, are electrolyzed using mercury (Hg) as a cathode. The Na—Hg amalgam formed is continuously removed and charged into a reaction vessel. The Hg is recovered and recycled back to the electrolyzer.

(2) Mercury is saturated with magnesium (Mg) at a high temperature. The amalgam formed is allowed to cool, forming a mixture of suspended MgHg crystals as well as a solution of Mg dissolved in Hg. This reducing mixture is charged into the reaction vessel.

(3) Magnesium or sodium is dissolved in Hg and the amalgam formed is the reducing mixture that is continuously charged into a reaction vessel containing compounds of Be, Cr, Ti, V or Zr.

(4) The reaction vessel is filled with Hg and an amount of solid Mg or Na or K is added thereto in proportion to the amount used by the reaction.

The reduction reaction requires a temperature above the boiling point of Hg which is about 360° C. The compounds of Be, Cr, Ti, V and Zr are difficult to reduce with Mg, Na or K and a considerable amount of heat is thereby evolved. As a result, the Hg, can be used only under pressure. To accomplish a continuous operation, the reaction must be carried out in a vessel at the temperature required and at the pressure prevailing at this temperature. The products of the reaction must be carried within the liquid to a part of the reaction vessel, or to a contingent section or partition or extension thereof or to a communicating vessel which is in liquid communication with the part of the vessel in which the reaction is performed and from which they are removed at a lower temperature and/or pressure, preferably normal atmospheric pressure.

The specific gravity of the reducing metals, and the reduced metal, and the reacting compounds or of the compounds being formed, is less than that of Hg or any other equivalent liquid metal used. The buoyancy of these materials is thus used to introduce them into and/or separate them from the melt.

The reaction vessel is designed to allow the products of the reaction to rise to the surface at an elevation or level higher than that of the level at which the reaction is performed, from which higher level they are removed by mechanical means. The higher level of the reaction product or extension thereof is at a distance suitable for keeping it at a temperature lower than that of the reaction vessel. It is advisable to have the upper level high enough to counteract any pressure developed at the temperature of reaction, the upper level being preferably as high as necessary to have it at normal atmospheric pressure, e. g. the temperature of the upper level is lower than the boiling temperature of Hg under normal atmospheric pressure.

The reaction $TiCl_4 + 2Mg = 2MgCl_2 + Ti$ evolves 121.8 kg./cal. per mol. Therefore, the reaction once stated requires no further heating. On the contrary, large quantities reacting per unit of time require effective cooling. When Na or K is used even more calories are evolved. It is, therefore, advisable to use in such cases dilute Na-amalgam with 0.2%–0.3% Na, which may be produced by electrolysis of an aqueous solution of a halogen-compound of the reducing metal, e. g. Na. This procedure has the advantage that the electric energy needed for the electrolysis of the NaCl, for example, is less than when produced from molten salt. The dilute amalgam is preferably preheated by exchange of heat with the hot mercury from the reaction vessel as it is being returned to the electrolysis apparatus.

There is, however, a serious difficulty in carrying out this process because of the fact that the reduced metals are prepared in a very fine state, forming a pudding or butter-like consistency with the liquid Hg. In this form they stay in suspension for a very long time and the reduced metals or other material rising to the top of the mercury contains so much Hg that it is sometimes impossible to separate the crystals from the Hg sufficiently by mechanical means. On the other hand, it was observed that by controlling the time and temperature before discharging reduced material it was possible to prepare rather coarse crystals of the reduced metal. By this method the crystals are allowed to grow and coalesce, and are finally separated by floating. These coarse crystals readily separate from the heavy liquid and contain whatever amount of Hg may be adhered to or included among or within the crystals. In this state it is easy to handle the coarse crystals and to further separate them from any adhering Hg by mechanical means, such as, filtering, centrifuging, pressing, rolling, extruding, and/or distillation.

Therefore, provisions are made to retain the reduced metals at a temperature and for a time suitable to allow the growth of the crystals to any desired coarse size and then convey them to the discharge section of the reaction vessel only after this crystallization has been performed.

If, in using dilute Na or K amalgam, the time for suitable coalescence should not be sufficient in one cycle, before recycling the Hg to the electrolyzer, the coarser crystals may be filtered out and the Hg together with the fine suspended reduced materials is again cycled through the electrolyzer. After several cycles the suspension of fine crystals is often coarse enough to be retained. The time of the many cycles constitutes the required retention time needed to form the desired size of crystals.

This invention is hereinafter explained, using as an example, the production of Ti from $TiCl_4$ with Mg as the reducing agent being dissolved in Hg. The temperature at which the reaction is carried out is about 1200° F. The pressure of Hg at this temperature is about 40 atmospheres. The drawing exemplifies a suitable equipment for performing this inventive process, wherein, most of the mercury remains constantly in the reaction apparatus while pieces of Mg are charged in appropriate amounts thereto. These pieces, approximately ½" in diameter, are drawn into the reaction vessel by a conveyor, for example, a chain conveyor. These Mg pieces pass through a pipe, which is filled with Hg flowing from the upper level downwards into the reaction chamber. The Mg floats up tube 1 by its buoyancy. It comes into the reaction vessel 2, where it is dissolved by mercury. The reaction vessel is made from steel, preferably from steel having high temperature tensile strength, e. g. austenitic steel alloyed with nickel-chromium. It is advisable to provide it with fins on the outside to increase the surface both for quicker heating to start the reaction of for cooling, if necessary, during operation of the process. At the same time the fins strengthen the structure. The vessel is in a furnace 3 in which it can be heated to reach the reaction temperature. When the reaction is uniformly steady, air may be blown through the furnace 3 to carry away excess heat. The $TiCl_4$ is taken from a storage vessel 4 and pumped by pump 4x into pipe 5.

An intimate mixture is effected, e. g. by mechanical stirring or by dividing the stream by distributors, or by the action of ultra-sonic waves.

It is advantageous to charge the amalgam, especially when dilute Na or K amalgams are used, together with the reducible compound into a tower filled with refractory material in a permeable condition, e. g. porcelain bells, the pores of which are big enough to allow the fine solid crystal particles formed by the reaction to pass therethrough. Such a tower may be added to the apparatus shown in the figure and offers the advantage of concentrating the temperature by the exothermic heat developed in a small space, thus allowing the continuous use of dilute Na or K amalgams.

In the embodiment shown in the figure the concentration of Mg in the amalgam may be ample, and the heat developed per unit of Hg can, therefore, be regulated to be sufficiently high so as to allow continuous operation.

The amount of Ti formed per unit of time is preferably controlled by the amount of $TiCl_4$ pumped into the reaction vessel. The products of the reaction, Ti and $MgCl_2$, are continuously propelled by a horizontal conveyor screw 7. The Ti and $MgCl_2$ crystals float up tube 8, which is about 100 feet high, and thus rise to the upper level of vessel 9. Contamination of Ti with Mg can be minimized by having a stream of Hg pumped by pump 16 through pipe 17 and down pipe 8 thereby washing the rising floatable materials.

Previous attempts for producing metals by amalgam metallurgy failed because of the formation of the so-called "amalgam-butter." This cause of failure has been overcome by the present invention by maintaining the reduced metal, e. g. Ti, in a high temperature section of the apparatus for a time long enough and at a temperature high enough to cause crystal growth to a size coarse enough to float rapidly and to separate readily.

It is also possible to operate in a manner to keep tube 8 and/or vessel 9 at a suitable temperature high enough to cause the particles to grow.

Above the vessel 9 it is advantageous to provide enough free space in chamber 10 to have a safety margin should any excess $TiCl_4$ vapors bubble up pipe 8 and build up to a high pressure because of heat expansion before being condensed in the condenser 6. It is also advantageous to fill the space within chamber 10 with a protective gas, e. g. argon, if the process is operated without excess $TiCl_4$.

The materials floated in vessel 9 are conveyed, for example, by a screw conveyor 11 into a vessel 12, which can be closed off by valves or cocks 13. In this vessel the material is washed, e. g. with water, preferably hot water, which may have a desirable content of HCl. By this method the $MgCl_2$ is removed. It is also preferable to wash with other suitable solvents, e. g. alcohol, the choice of which depends on the nature of the products to be dissolved if, e. g., Na or K are used as reducing metals. If Al is used, for example, as a reducing metal to produce Be from $BeCl_2$, the $AlCl_3$ may be removed by distillation.

Vessel 12, which is located in a furnace 14, is heated to about 900–1000° F. in order to vaporize any adhering solvent followed by vaporization of any adhering Hg, which is condensed and returned to the Hg stock vessel 15, from which it may be pumped by the pump 16 either into pipe 17 or 18 and so brought back to the reaction chamber 2. It is preferable to apply vacuum to obtain Ti substantially free from Hg. It is also possible to first drive off the mercury and then the adherent impurities Mg and/or $MgCl_2$ by distillation instead of a washing operation.

The final purified crystal product is removed from conduit 19. In continuous operation it is advisable that at least two pices of equipment like vessel 12 will be filled and operated alternately. This operation can also be performed continuously by proper equipment, e. g. by conveying the reduced material first in a washing drum and from there through a rotary kiln. The material which rises into vessel 9 can also be washed, then conveyed to a press or centrifuge, where most of the solvent and Hg may be removed, before it is heated to distill off any remaining mercury.

Washing of the material in vessel 12 is accomplished by conducting water through conduit 20 which has a control valve 21 therein, allowing the wash water to escape through conduit 22 after passing through a filter.

The volatilized mercury from vessel 12 is conducted to mercury condenser 23 through pipe 24. When the mercury condenser is operated under vacuum, a vacuum pump 25 is supplied and a refrigeration unit 26 is introduced between the condenser 23 and the pump 25 thereby preventing mercury vapors from mixing with the oil of the vacuum pump. The vacuum is applied to the refrigeration unit 26 through pipe 27, and the vacuum from the refrigeration unit is applied to the condenser 23 through pipe 28. Mercury condensed in the refrigeration unit is returned to the condenser outlet pipe 29 by means of pipe 30.

Pipe 29 conducts the recovered mercury to storage chest 15 whence it is conducted through the valve controlled line 31 to pump 16. A valved controlled pipe 32 connects vessel 9 to pump 16 for return flow of recycle mercury therein. Mercury in pipe 18 mixes with incoming pieces of Mg or Na in pipe 33 for passage through pipe 1 into the reaction vessel 2. Said reaction vessel having its screw conveyor 7 rotated by a motor 34. Similarly the screw conveyor 11 is rotated by a motor 35.

The metallic crystals, e. g. Ti crystals, recovered by this process are in a more or less powderlike condition and virtually free from oxide.

The process and apparatus described can be used to produce not only Be, Cr, Ti, V or Zr, but also alloys thereof, by adding compounds of the alloying metal to the compounds of the basic metal to be reduced. For example, Ti may be alloyed with a suitable percentage of Cr. Up to now Cr, which is produced by electrometallurgical methods, has to be finely powdered in order to be mixed with Ti powder before sintering or melting. This procedure is rather costly and can be replaced by the invention by simply adding the desired amount of chromium trichloride ($CrCl_3$) to the $TiCl_4$ so that both chlorides may be reduced simultaneously.

This invention can be used with other metals in the place of mercury, metals which do not take part in the reaction, and which preferably do not form alloys with the reduced metals to any appreciable amount, for example lead (Pb), bismuth (Bi), tin (Sn), gallium (Ga) or alloys thereof. Such metals may also be used to form the reducing mixture, or solution, or suspension, e. g. with Mg, or Na, or K. Such other metals offer the advantage of having a higher boiling point than Hg, thus allowing the discharging level to be at a smaller distance from the reaction vessel, which, in this case, would be below the vapor pressure of the compound to be reduced. On the other hand, there is the disadvantage that the recovered metal is contaminated with Pb, Bi, Ga, or Sn, and requires a washing operation with Hg, from which, for economic reasons, Pb, Bi, Ga, or Sn have to be recovered.

This invention comprises the reduction of all compounds which are reducible by metals selected from the group consisting of alkali metals, alkaline earth metals, aluminum and magnesium by the method described, including reduction of their double salts. In this latter case, the salt accompanying the reducible compound is collected and removed together with the reduced metal and finally separated therefrom. An example of such a double salt is $ZrF_6K_2$, which can be reduced by Na or K amalgam at an elevated temperature. Such salts are easily produced from Zr bearing minerals.

Having described my invention, what I claim and desire to secure by Letters Patent is as follows:

1. In a process for preparing metals selected from the group consisting of beryllium, chromium, and vanadium, comprising the formation of a suspension of said metal in mercury, by the reduction of a halide of said metal, using for the reduction an amalgam, being at a temperature at least high enough to maintain said amalgam in the liquid phase, containing at least one reducing metal selected from the group consisting of alkali metals and alkaline earth metals, including magnesium, dissolved in mercury, and in which the said reduced metal is separated from the said suspension, the improved step consisting in effecting a coalesced crystalline phase containing said reduced metal by heating the suspension within liquid mercury at a temperature of about 360°–649° C., applying a pressure sufficiently high to keep the mercury liquid at that temperature until the particles rise and form a buoyant layer thereof atop of the liquid, moving the agglomerated particles from said upper level to at least one discharge outlet, squeezing most of the adhering mercury from said moved agglomerate, massing the discharge outlet with the agglomerates, and discharging said agglomerates from said outlet intermittently, but leaving at said outlet a proportion of massed agglomerates sufficient to provide a seal sufficiently tight to substantially prevent loss of mercury.

2. In a process for preparing a metal selected from the group consisting of beryllium, chromium, and vanadium, comprising the formation of a suspension of said metal in mercury, by the reduction of a halide of said metal, using for the reduction an amalgam, being at a temperature at least high enough to maintain said amalgam in the liquid phase, containing at least one reducing metal selected from the group consisting of alkali metals and alkaline earth metals, including magnesium, dissolved in mercury, and in which the said reduced metal is separated from the said suspension, the improved step which consists in effecting a coalesced crystalline phase containing said reduced metal by heating the suspension in liquid mercury at a temperature of about 360°–649° C., applying a pressure sufficiently high to keep the mercury liquid at that temperature until the particles rise and form a buoyant layer thereof atop of the liquid, said layer being located sufficiently high that the static pressure of the column of mercury above the bottom of the vessel counteracts the vapor pressure of the mercury within the lower part of the vessel.

3. In a process in which a metal selected from the group consisting of beryllium, chromium, and vanadium is produced by the reduction of at least one of the chlorides of said metal by means of an amalgam, containing reducing metals, the improvement which comprises using liquid amalgam containing both sodium and magnesium dissolved in mercury in quantitative proportions so as to obtain the products of the reaction, besides the released metal, of the group aforesaid, sodium chloride and magnesium chloride in quantities approximately corresponding to the eutectic composition of the mixture of sodium choride and magnesium chloride, the reaction being performed at a temperature above 430° C., the melting point of said salt mixture, up to 649° C., applying a pressure sufficiently high to keep the amalgam liquid, the temperature being maintained for a time sufficiently long to effect a coalesced crystalline phase containing particles of the released metal of the group aforesaid, and until the said particles rise to an upper mercury level of the vessel in which the reduction is effected, removing the floating products from said level, and separating the coalesced metal particles from the salt mixture and from mercury.

References Cited in the file of this patent

UNITED STATES PATENTS

| | | |
|---|---|---|
| 2,061,250 | Perkins | Nov. 17, 1936 |
| 2,161,180 | Marx | June 6, 1939 |
| 2,205,854 | Kroll | June 25, 1940 |
| 2,226,525 | Dolan | Dec. 24, 1940 |
| 2,564,337 | Maddex | Aug. 14, 1951 |
| 2,618,549 | Glasser et al. | Nov. 18, 1952 |
| 2,618,550 | Hampel et al. | Nov. 18, 1952 |
| 2,707,679 | Lilliendahl et al. | May 3, 1955 |
| 2,758,921 | Schmidt | Aug. 14, 1956 |

FOREIGN PATENTS

| | | |
|---|---|---|
| 296,867 | Germany | Mar. 13, 1917 |

OTHER REFERENCES

Österreichische Chemiker-Zeitung, Jg. 49, Heft 5/6, May–June 1948. Pages 102–114. Article by H. Hohn on "Amalgammetallurgie." Page 107 pertinent. (Copy available in Bureau of Standards Library, Washington, D. C.)